(No Model.)
H. WILCOX.
CULTIVATOR.
No. 285,193.  Patented Sept. 18, 1883.
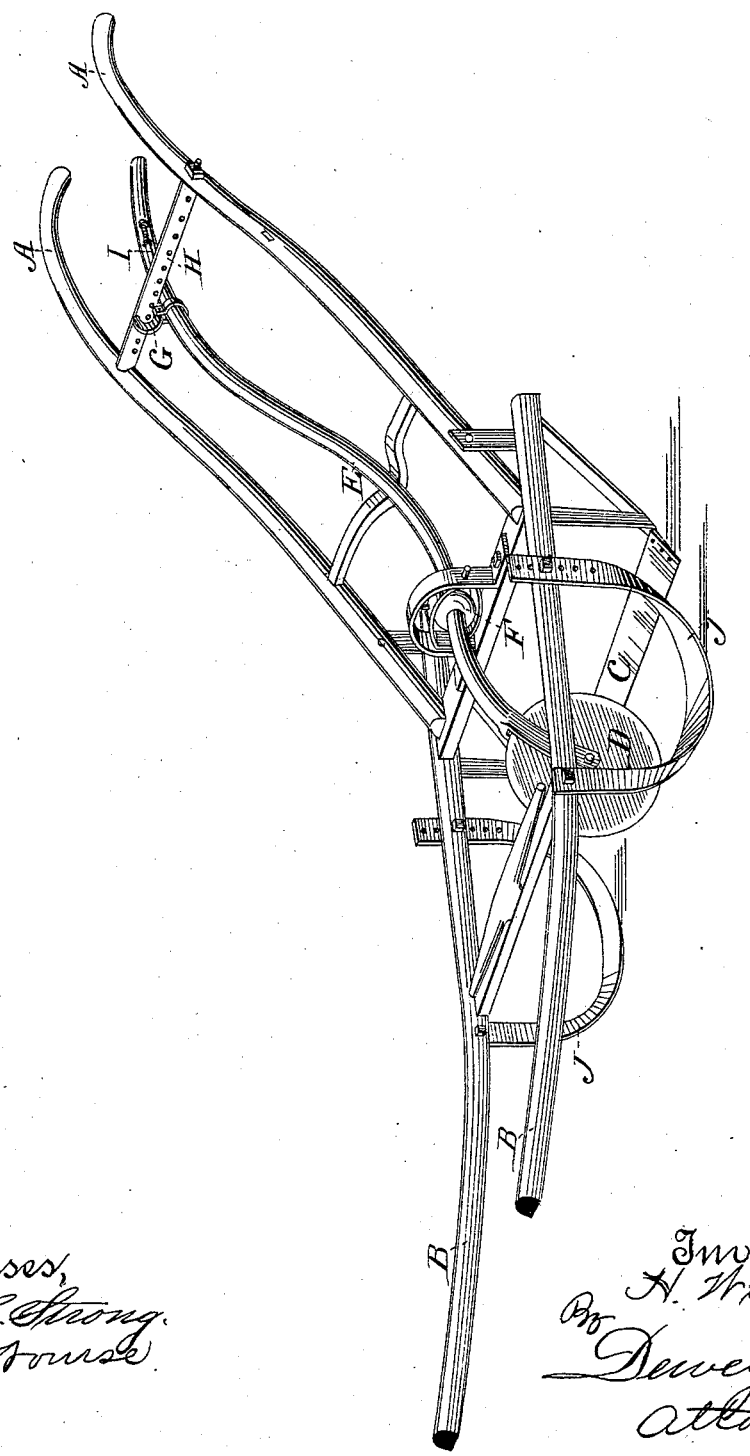
Witnesses,
Geo. H. Strong.
J. H. Course
Inventor,
H. Wilcox
By Dewey & Co.
Attorneys

UNITED STATES PATENT OFFICE.

HARVEY WILCOX, OF LOS GATOS, CALIFORNIA.

CULTIVATOR.

SPECIFICATION forming part of Letters Patent No. 285,193, dated September 18, 1883.

Application filed May 26, 1883. (No model.)

*To all whom it may concern:*

Be it known that I, HARVEY WILCOX, of Los Gatos, county of Santa Clara, State of California, have invented an Improvement in Cultivators; and I hereby declare the following to be a full, clear, and exact description thereof.

My invention relates to an improved apparatus for cultivating the soil, which is especially applicable to land between rows of trees, vines, &c., and upon hillsides; and it consists of a frame having teeth or a cutting blade or blades and a rigid pole or shafts for the attachment of a horse. In combination with this is a rolling cutter or colter mounted in one end of a lever, so as to travel in the ground near the cutter or cultivator, while the upper end of the lever is adjustable from right to left, and may also be moved vertically to throw the colter out of or into the ground, as will be more fully explained by reference to the accompanying drawing, in which the figure is a perspective view of my cultivator.

A A are handles which serve to guide the cultivator, and B are shafts or a pole, for one or two horses, as may be desired, being secured rigidly to the frame and handles, so that they form a part of the machine.

The cultivator C may be of any suitable or desired form, having teeth-cutters, or, as shown in the present case, a blade extending horizontally across the frame, from which it is supported, and having its front or cutting edge depressed to enter the ground and cut the weeds, as well as cultivate and stir up the soil.

In working between rows or upon hillsides it is difficult to guide the cultivator close to or around trees or vines, or to prevent its slipping sidewise if the incline is at all steep. I obtain perfect control over the machine by the use of a sharp-edged wheel or rolling colter, D, which has its axle journaled in the lower end of a lever, E, which has its fulcrum at F in a swivel, which allows it to be moved from side to side for proper adjustment, and also allows of a vertical motion, so that the lever may be moved to raise the colter out of the ground when desired.

G is a hook at the upper end of the lever, which may be clasped over the transverse bar H, extending between the handles. This bar has notches or perforations, and a spring-bolt or other locking device, I, upon the lever engages either notch or hole desired, and thus retains the lever in a central position, or at one side or the other, as may be required. When the hook G is unclasped from the bar, the upper end of the lever is allowed to drop and rest upon a bar below, thus raising the colter D out of the ground. The front end of the cultivator is directed by simply guiding the horse to one side or the other, and the rear portion is either directed to one side or the other, or held centrally by means of the colter and lever, independent of any motion of the front part. By this device I am enabled to prevent a cultivator from slipping down sidewise upon the steepest incline, and where there are trees which it is desirable to cultivate around and close to, I can throw the cultivator out and around the tree and bring it in again close to the opposite side without altering the direction of the horse, simply by using the lever E, thus saving a second or cross cultivation in many cases. The action of this sharp-edged rolling colter is to hold the cultivator on its course as a rudder guides a ship. By having the colter D run just in front of the cutter or cultivator I prevent its packing the soil, as the cultivator loosens it up after the wheel has passed.

The depth to which the cutter or cultivator works may be regulated by a gage, J.

Having thus described my invention, what I claim as new, and desire to secure by Letters Patent, is—

1. In a cultivator having rigid handles and shafts or pole, as shown, a rolling cutter or colter journaled at the lower end of a lever which has its fulcrum upon the frame, so that the lever and colter may be moved from side to side, substantially as herein described.

2. In a cultivator, the colter journaled at the lower end of a lever, said lever being fulcrumed in a swivel, which allows it a horizontal and vertical motion, substantially as herein described.

3. In a cultivator, the combination of a rolling sharp-edged colter journaled upon a lever which is swiveled and fulcrumed upon the frame, with a transverse notched or perforated bar, H, hook G, and bolt or catch I, substantially as herein described.

In witness whereof I have hereunto set my hand.

HARVEY WILCOX.

Witnesses:
GEO. H. STRONG,
S. H. NOURSE.